United States Patent [19]

Browning et al.

[11] Patent Number: 4,580,997

[45] Date of Patent: Apr. 8, 1986

[54] TWO SPEED SPROCKET SHIFT ASSEMBLY

[75] Inventors: Bruce W. Browning; Christopher M. Browning, both of Seattle, Wash.

[73] Assignee: Bicycle Partnership #1, Bainbridge Island, Wash.

[21] Appl. No.: 551,210

[22] Filed: Nov. 14, 1983

[51] Int. Cl.$^4$ ............................................. F16H 9/00
[52] U.S. Cl. ...................................... 474/78; 474/80; 474/160
[58] Field of Search ................... 474/78, 79, 80, 152, 474/162, 160, 82, 122; 74/341, 348, 448, 439

[56] References Cited

U.S. PATENT DOCUMENTS 4,127,038 11/1978 Browning ...................... 474/160 X Primary Examiner—Stephen J. Novosad
Assistant Examiner—Frank McKenzie
Attorney, Agent, or Firm—B. Deon Criddle

[57] ABSTRACT

A two speed sprocket and chain shift assembly with one sprocket having a small pivoted sprocket segment and means for shifting the chain from one sprocket to another upon pivoting of the sprocket segment and with the chain being entrained on one sprocket when an operating means is activated and entrained on the other sprocket when the operating means is released.

31 Claims, 7 Drawing Figures

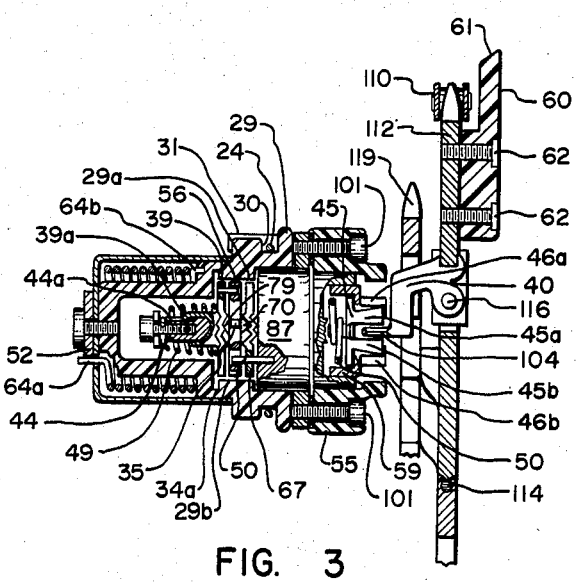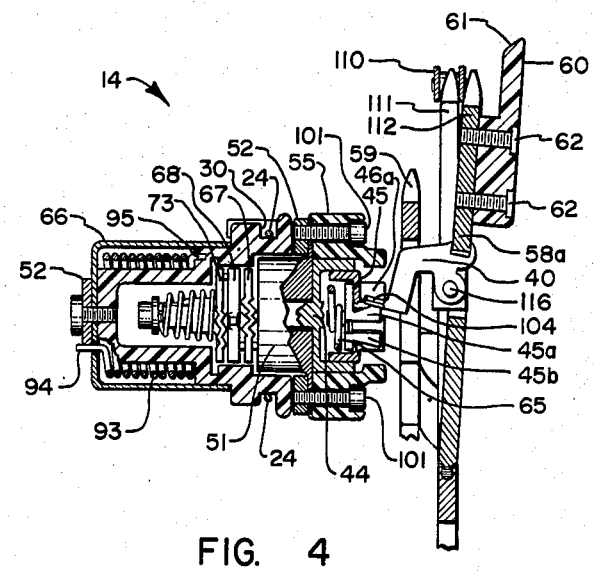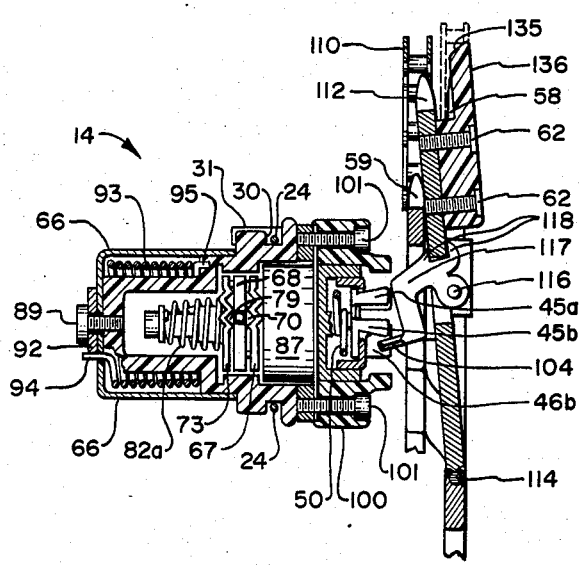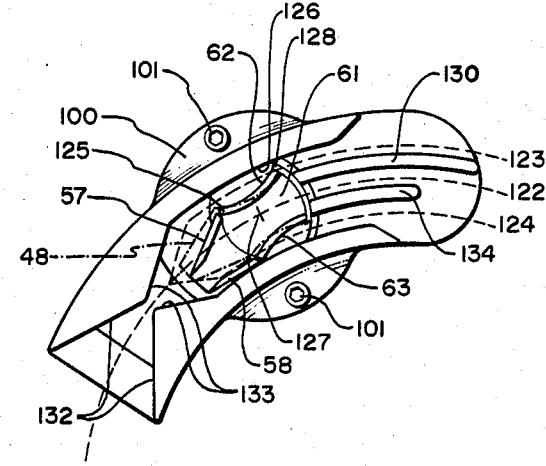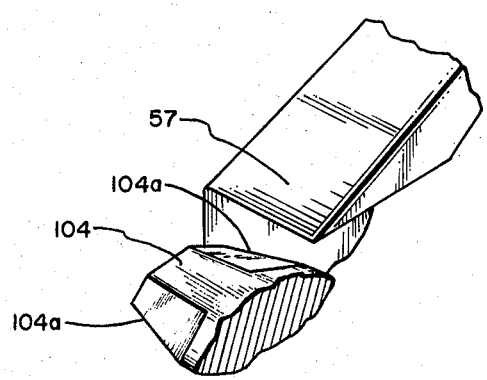
FIG. 3
FIG. 4
FIG. 5
FIG. 6

TWO SPEED SPROCKET SHIFT ASSEMBLY

BRIEF DESCRIPTION OF THE INVENTION

1. Field of the Invention

This invention relates to means for shifting a chain from a sprocket of one diameter to a sprocket of another diameter as a means of providing a different selected drive ratio. It is particularly related to drive sprocket assemblies having split or tilting sprockets such that a portion of a tilting sprocket will align with a portion of a nontilted sprocket and with the shifting of a chain from one sprocket of the assembly to another.

2. Prior Art

The advantages of and need for variable speed chain and sprocket assemblies has long been recognized. U.S. Pat. Nos. 3,448,628 and 3,583,249 show derailleur mechanisms of the type commonly found on bicycles for the purpose of shifting a chain from sprocket to sprocket in a cluster of sprockets having different diameters, for example. Other devices, such as those shown in U.S. Pat. Nos. 3,798,989, 3,861,226 and 3,800,613 show mechanisms where the effective diameter of a compound sprocket is varied to achieve different speed ratios.

In my U.S. Pat. No. 4,127,038 there is shown a sprocket shift assembly wherein a chain is moved from sprocket to sprocket, with the sprockets being of different diameter, while maintaining a positive drive connection during shifting by tilting a portion of a receiving sprocket to align with the teeth of a chain entrained sprocket to receive the chain before resuming the untilted position with the chain then entrained thereon.

With the development of the shifting assembly that will permit a positive connection between host sprocket, chain and receiving sprocket there has developed a need for a positive mechanical shift mechanism to selectively effect the chain transfer from sprocket to sprocket.

It has also been recognized that a low-cost, reliable shifting assembly is needed to be used with a two-speed sprocket assembly, particularly for bicycles and the like. A two-speed sprocket assembly having a pair of sprockets of different diameter and with only one sprocket having a small pivoted sprocket segment has been developed and, together with a shifting means therefor, has been found quite satisfactory for use on bicycles and the like.

OBJECTS OF THE INVENTION

Principal objects of the present invention are to provide a simple, reliable shift mechanism for bicycles and the like providing two drive speed ratios and including movable means that is positioned while not under load to transfer a chain from sprocket to sprocket.

Still another object is to provide a shift mechanism adaptable for use on a bicycle that will permit an operator to hold the chain in a lower speed ratio position and that, when released, will move the chain to a higher speed ratio position.

Additional objects and freatures will become apparent from the following detailed description and claims.

THE DRAWINGS

In the drawings:

FIG. 1 is a perspective view of a bicycle equipped with the two speed sprocket shift assembly of the present invention;

FIG. 2, an enlarged side elevation view taken within the line 2—2 of FIG. 1;

FIG. 3, a sectional view, taken on the line 3—3 of FIG. 2;

FIG. 4, a view like that of FIG. 3, but showing sprocket segments pivoted in a first direction;

FIG. 5, a view like that of FIGS. 3 and 4, but showing the sprocket segments pivoted in a second direction;

FIG. 6, an enlarged plan view of the pawl guide and housing; and

FIG. 7, an exploded perspective view of the control mechanism of the sprocket and chain shifter.

DETAILED DESCRIPTION OF THE INVENTION

Figure 1:
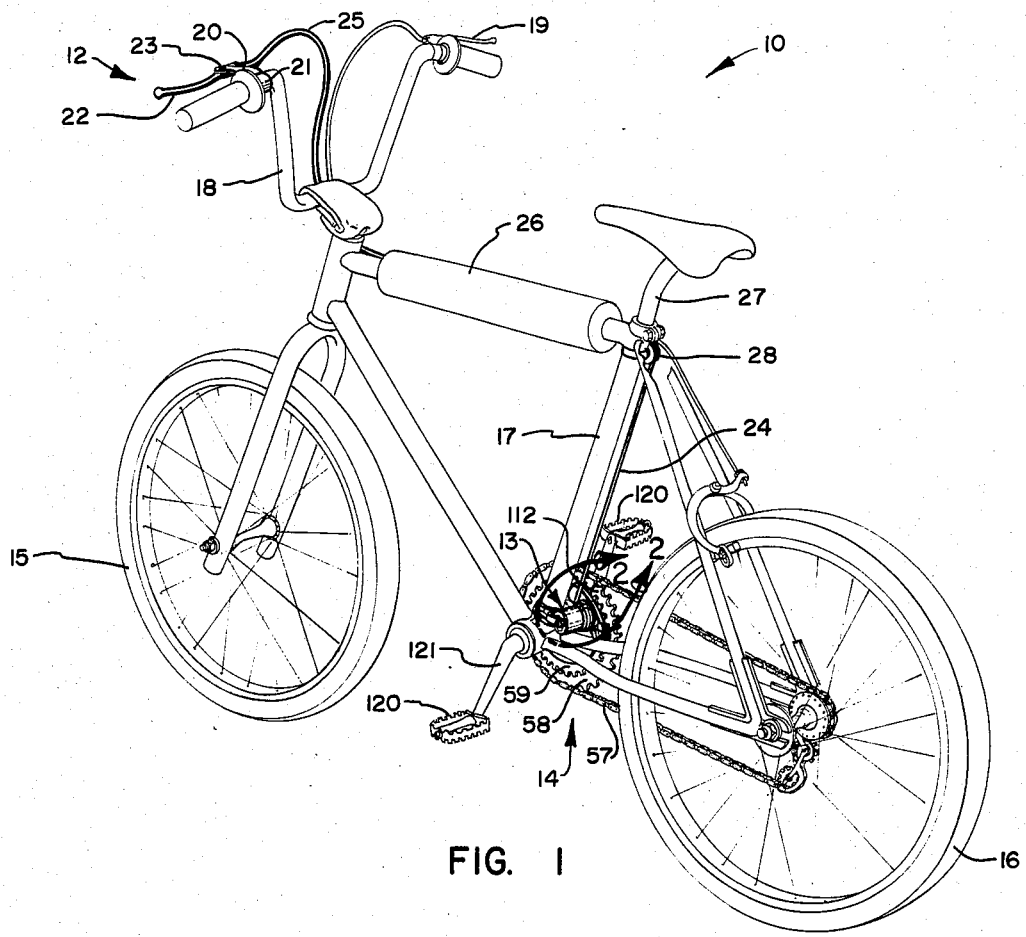

Referring now to the drawings:

In the illustrated preferred embodiment, a bicycle, shown generally at 10 has a shifting assembly of the invention, made up of a shift lever shown generally at 12, a control mechanism shown generally at 13, and a sprocket and chain shifter shown generally at 14. The bicycle includes the usual front and rear wheels shown as 15 and 16, respectively. The wheels are attached to the bicycle frame 17 by means of conventional axles and nuts. The shift lever 12 is attached to bicycle handlebar 18 and the bicycle may be equipped with the usual hand brake and control 19.

The shift lever, shown generally at 12 includes a housing 20 that is clamped to handlebar 18 by means of a band 21. A shift lever 22 is mounted to the housing 20 by means of a pivot pin 23 that extends through the housing 20 fixed to the handlebar. A flexible cable 24 has one end connected to shift lever 12 and passes through its own flexible sheath 25, which protects it from binding during operation. The flexible cable and sheath extend from the shift lever 22 and through a frame protective pad 26, as shown. The cable passes over an idler pulley 28 mounted to frame 17 adjacent to a seat post 27. The cable 24 is directed over pulley 28 from a substantially horizontal path to a substantially vertical path.

Figure 2:
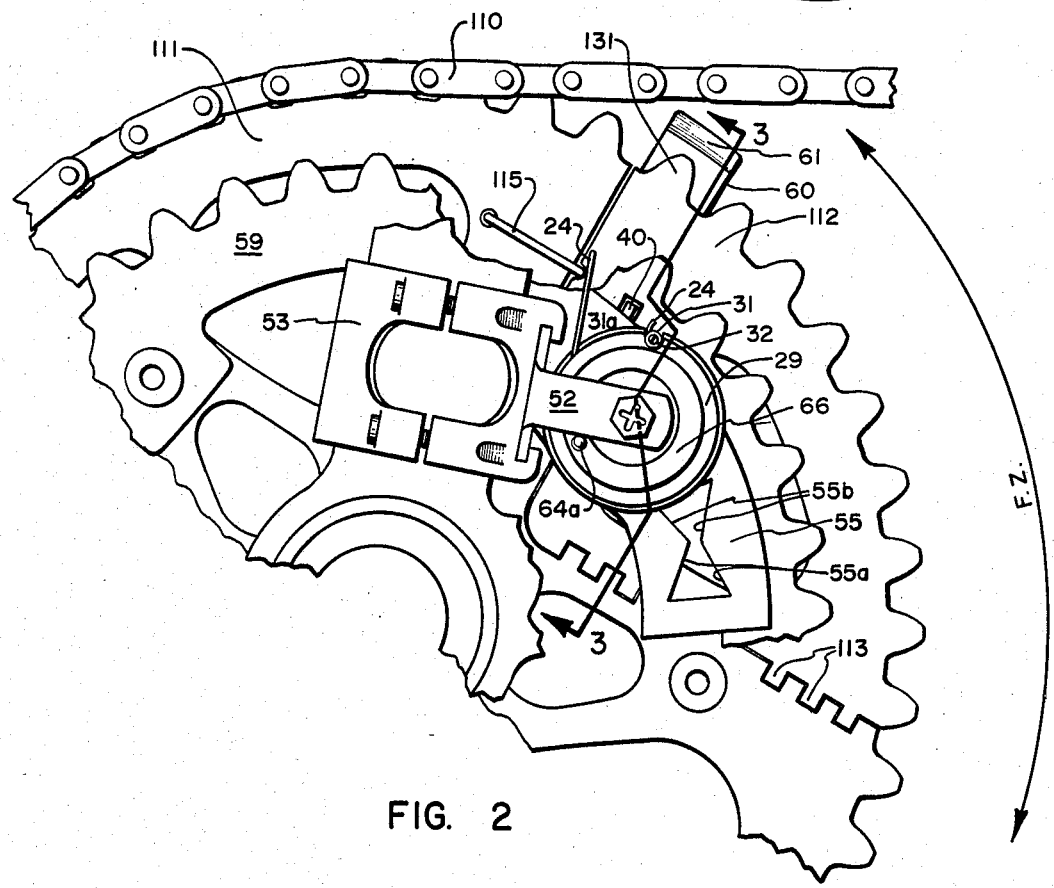

Cable 24 has one end wrapped around a cam pivot housing 29, shown best in FIG. 2 and the other end thereof is secured to pin 31. Pin 31 is positioned in a groove 31a that extends perpendicular to groove 30 of pivotal housing 29 as best viewed in FIG. 3. The groove that holds axle 31 is recessed into pivot housing 29 to lock pin 31 against pivot housing 29. Cable 24 is locked to pin 31 with a set screw 32 shown best in FIG. 2.

Figure 7:
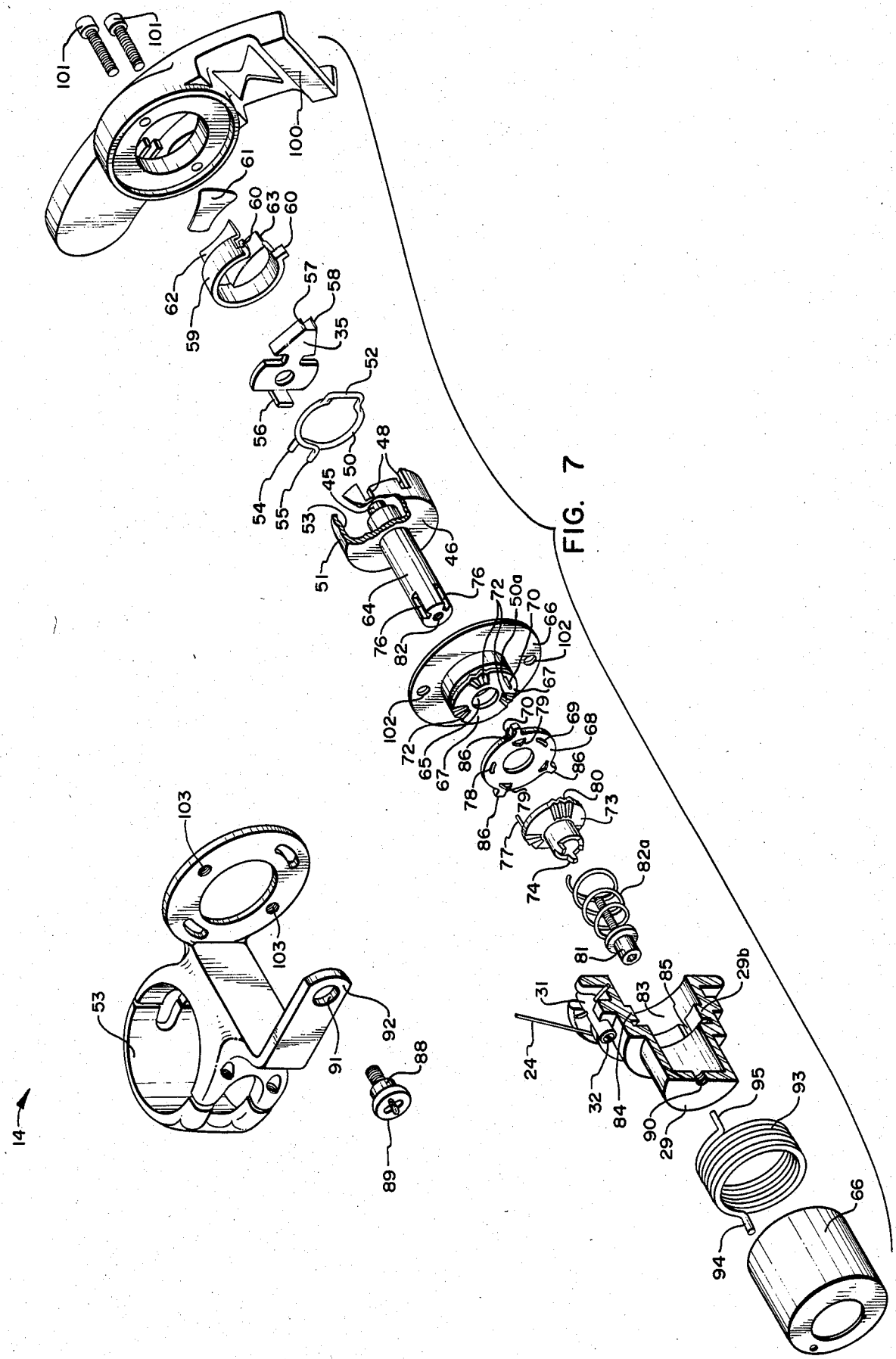

The component parts of the control mechanism as shown generally at 13 are best viewed in FIG. 7 while the operative relationships of the parts are most clearly illustrated in FIGS. 3–7.

Referring to FIG. 7, a front cam 35 is pivotally mounted on projecting stud 45 of a cam spindle 46. Stud 45 fits into a hole 47 of the front cam 35. The rotation of front cam 35 on stud 45 of the cam spindle 46 is limited by the defining walls of the notches 48. Front cam spring 50, which encircles a cylinder 51 of the cam spindle 46, has a U-shaped bend 52 which is fixed to an inner wall of a cup-shaped recess 53 of the cam spindle 46 and has two projecting legs 54 and 55, which bear on either side of the tab 56 of the front cam 35. Thus, cam spring 50 tends to center the cam surfaces 57 and 58 of the front cam 35 between the defining surfaces of the notches 48 and allow the front cam rotational movement each side of center against a light spring bias. Holding the front cam 35 in assembly on stud 45 is the rear cam 59 which is press fitted into the cup-shaped recess 53 of the cam spindle 46. The rear cam 59 has two radially projecting spaced apart tabs 60 which fit into the notches 48, thus, preventing any rotational movement between the rear cam 59 and the cam spindle 46. A plastic dust cover 61 snaps between cam surfaces 62 and 63 of the rear cam 59 to prevent foreign matter from interfering with the rotational movement of the front cam 35 relative to the cam spindle 46.

Cam spindle 46 has a shaft 64 which is journaled within a hole 65 of a stationary housing 66. Shaft 64 also passes freely through a center hole in a click plate 67 which is attached rigidly by soldering to the back of stationary housing 66.

A clutch plate 68 slips freely on the shaft 64 and is rotationally oriented to click plate 67 by an elongate hole 69, through which pin 70 projecting from the surface of click plate 67, extends. The clutch plate 68 must be oriented to click plate 67 to provide for proper mating of three angularly spaced fingers 71 projecting from one surface of the clutch plate 68 with three indentations 72 formed at one hundred twenty degree intervals in one face of click plate 67. The function of the fingers and indentations will be hereinafter explained.

A second click plate 73 is slipped onto shaft 64 and is oriented to the shaft by small tabls 74 on click plate 73 which slide longitudinally in spaced slots 76 formed on the end of shaft 64. So arranged, click plate 73 has a longitudinal movement in relation to cam spindle 46 but cannot rotate thereon. Similarly, the assembly of click plate 73 and cam spindle 46 is rotationally oriented to the clutch plate 68 by a pin 77 that projects from one face of click plate 73 and into another elongate hole 78 of the clutch plate 68. This orientation is necessary so that fingers 79 extending from the surface of the clutch plate 68, at a side opposite fingers 70 will mate with indentations 80 formed at one hundred twenty degree intervals on a surface of the click plate 73.

In holding the cam spindle 46, the stationary housing 66, the clutch plate 68 and the click plate 73 assembled, a bolt 81 is threaded into a hole 82 of the cam spindle 46. A spring 82a has one end seated against a collar of bolt 81 and its other end against click plate 73 to resiliently bias the click plate 73, the clutch plate 68, and the click plate 67 together when bolt 81 is threaded into bore 82.

The pivot housing 29 has a bore 83 formed in one end thereof, and the bore 83 has an annular ring 84 extending inwardly from the wall of the bore. The annular ring 84 is interrupted by slots 85 spaced at one hundred twenty degree intervals. When the pivot housing 29 is assembled to the stationary housing 66, tabs 86, which project radially from the periphery of clutch plate 68, fit snugly into slots 85. Thus, the rotation of pivot housing 29 is transferred directly to clutch plate 68. The bore 83 of pivot housing 29 telescopes over and is journaled on a flange 87 of the stationary housing 66, and a collar 88 on a screw 89, which threads securely into hole 90 of the pivot housing 29, turns within a hole 91 of a mounting bracket 92. The pivot housing 29 is spring biased against the pull of cable 24 by a coil spring 93 which has one end 94 held by the U-shaped mounting bracket 92 and its other end 95 eccentrically connected to the pivot housing 29.

The stationary housing 66, with its associated parts assembled as described above, along with a pawl guide housing 100 is held rigidly to the U-shaped bracket 92 by bolts 101 which pass through holes in the pawl guide housing 100, then through holes 102 in the stationary housing 66 and thread into holes 103 in the U-shaped bracket 92.

As previously described, clutch plate 68 has pointed fingers 70 extending at one hundred twenty degree intervals from one face thereof and fingers 79, similarly angularly spaced, extending from the opposite face thereof. Fingers 70 are formed with ninety degree points, and fingers 79 have one hundred twenty degree points. That is, the included angles formed by the inclined surfaces of the fingers are ninety degrees and one hundred twenty degrees, respectively. Fingers 70 engage indentations 72 of a corrugated pattern on the surface of the click plate 67e. The indentations have matching inclined slopes forming an included angle of ninety degrees. Fingers 79 engage indentations 80 of corrugated patterns formed on the opposite face of click plate 67. The indentations 80 have matching inclined slopes forming an included angle of one hundred twenty degrees. Fingers 70 have two positions of rotations relative to click plate 67. A first position is as shown in FIG. 3, and the other position is as shown in FIGS. 4 and 5. The two positions of fingers 70 correspond to the two positions of rotation imparted to the clutch by the manipulation of lever 22, as will be further described. Similarly, fingers 79 have two positions of rotation relative to click plate 73, i.e., one as shown in FIGS. 3 and 4, and one as shown in FIG. 5. These latter two positions correspond to the two positions of rotation imparted to the cam spindle 46 through the action of the pawl 104 on the rear camming surfaces 62 and 63, as will be further described. Fingers 70 and 79 are biased into engagement with their corresponding click plates 67 and 73 by the force of the spring 82a. The amount of force required to rotate the fingers 79 relative to click plate 73 is less than the amount of force required to rotate fingers 70 relative to click plate 73 because the included angle of one hundred twenty degrees is formed by lesser inclined surfaces than are used to form the included angle of ninety degrees.

Shift lever 22 has a pulled position and a not pulled position. In operation, each time shift lever 22, FIG. 1, is pulled toward handlebar 18 and is pivoted about its pivot pin 23, the cable 24, that is attached to shift lever 22, is also pulled. When cable 24 is pulled, as best seen in FIG. 7, the force is applied to pin 31 to pivot housing 29 about a center axis running horizontally through the control mechanism 13. Thus, when lever 22 is pulled clutch plate 68 rotates fingers 70 from a first position relative to plate 67 into a second position relative to plate 67. The amount of rotation resulting from such pulling action is approximately ten and one-half degrees. Also during pulling of lever 22 the cam spindle 46, along with the front and rear cams 35 and 59, previously described, which are attached thereto, is being turned from one position to another as a result of fingers 79 acting against click plate 73. The tabs 74 then act in slots 76 of the spindle 46 to rotate the spindle. Thus, the force necessary to turn the cam spindle 46 is less than the force necessary to move the fingers 79 relative to click plate 73. The "not pulled" position is shown in FIG. 3 and by dotted lines in FIG. 6, and the "pulled" position is shown in FIG. 4 by solid lines in FIG. 6. With the lever 22 in the pulled positon either the cam spindle 46 may be turned by action of the pawl 104 on the rear cam 59, or the cam spindle 46 may not be turned. If the cam spindle is not turned, the release of or nonpulling of lever 22 will permit spring 93 to counterrotate pivot housing 29. The clutch plate 68 then moves fingers 70 back to the first position relative to click plate 67, as shown in FIG. 3 and by the dotted lines in FIG. 6. If the cam spindle 46 is turned then the click plate 73 is also forced to rotate and fingers 79 click into a second position relative to click plate 73, as shown in FIG. 5. In FIG. 6 the dotted line view 48 represents the intermediate pulled position, and the not pulled position, if shown, would show the front cam surface 45a approaching surface 55c of the pawl guide 55.

As shown in FIG. 2 a chain 110 is entrained on a large sprocket 111. Large sprocket 111 has a pie-shaped section cut from it which has been replaced by a swinging sector 112 which has a crenelated patterned hinging side 113 and a hinge pin 114, FIG. 5, for interconnecting the swinging sector 112 to sprocket 111. The hinge line, as represented by the center of the hinge pin 114, is oriented generally at ninety degrees to the resultant of the combined torque and compressive forces developed between the sprocket and the chain whether the swinging sector 112 is in the driving position, as shown in FIG. 5, or in a shift position, as shown in FIG. 5. Because of the position of the hinge, it is not necessary to latch the swinging sector 112 in either the driving position of FIG. 3 or the shift position of FIG. 5. The swinging sector 112 is spring biased to the driving position of FIG. 3 by a U-shaped spring 115, one leg of which is shown in the broken away portion of FIG. 2. In the absence of such a spring, the swinging sector is free to swing to either side of the plane of the sprocket 111. The swinging sector is maintained in the driving position of FIG. 3 by the position of the hinge which supports the load, the chain 110 which acts as a latch between sprocket 111, and the swinging sector 112, and, when the sector 112 is not in contact with the chain, by the U-shaped spring 115. The means for maintaining the swinging sector 112 in its shift positions will be described in detail, hereinafter.

As best seen in FIGS. 3, 4 and 5, a switch lever pivot pin 116, fixed rigidly in the radial face of the pie-shaped cutout section of the sprocket 111, freely supports a switch lever 117 having the pawl 104 projecting from an end thereof. The switch lever 117 is attached to the swinging sector 112 by fingers 118 so that when the pawl is pivoted up or down the pivoting motion is transferred to the swinging sector 112.

As the sprocket 111 rotates, in response to the forces applied to bicycle pedals 120, through a crank 121 to which the large sprocket 111 and a small sprocket 119 are affixed, the pawl 104 describes a circular path around the sprocket axle and passes through designated channels in the pawl guide housing 100. The front and rear cams 35 and 59, occupying the central zone of the various channels through which the pawl must pass, may be rotated into three positions, i.e., a central position shown by dotted lines in FIG. 6, a down position shown by solid lines in FIG. 6, and an up position not shown. In the central position the pawl 104 travels through a central channel 122 in the pawl guide housing 100 without obstruction. The sprockets 111 and 119, along with the switch lever and pawl 117 and 104, respectively, rotate, as shown in FIG. 3. The rotation may be forward or backward and may be reversed at any point without disturbance to the pawl 104. If the pedalling is forward and the cams 35 and 59 have been rotated to the down position, the pawl 104 will follow a path 123 and the chain 110 will be shifted from the big sprocket 111 to the little sprocket 119, as will be explained further. If the pedalling is forward and the cams 35 and 59 are rotated to the up position the pawl 104 will follow the channel 124 and the chain 110 will be shifted from the little sprocket 119 to the big sprocket 111. The pawl 104 is specially shaped to engage surfaces of cam 35 so that no binding action will occur. The pawl 104 has leading edges 104a that are each formed as a knife edge and that are angled with respect to corners of the cam surface engaged by the pawl. Thus, a point rather than a line contact is made between cam corner and pawl knife edge and the cam corner will be readily guided past the knife edge.

Various operating sequences will occur depending upon the manner of operation of the shift assembly of the invention. Typical sequences are as follows:

Sequence I

If the pedalling is forward, withouth any back pedalling during the operation of the mechanism, and the shift lever 22 is pulled at a time when the pawl 104 is not rotated, with the sprockets to be between cam surfaces 57 and 58 where it will interfere with the front cam 35, the cams 35 and 59 are rotated to a down position. As the pawl 104 initially travels into the pawl guide housing 100 through channel 122 it strikes cam surface 57 and is pivoted upwardly to the position of FIG. 4. The pawl 104 travels past cam surface 57 and passes a front corner 125 of the rear cam 59 through the limited space provided between corner 125 and a rub rail surface 126 of the pawl guide housing 100. The pawl 104 then passes the center of rotation 127 (i.e., the longitudinal axis of the control mechanism 13) of the rear cam 59 and strikes the corner area 128 of the rear cam 59. At this time corner 128 and rub rail surface 126 are so closely spaced that the pawl cannot pass therebetween. Inasmuch as rub rail surface 126 is part of the pawl guide housing 100, which is attached rigidly by means of the bracket 92 to the bicycle frame 17, rub rail surface 126 will not move. The pawl 104 which is now braced by the rub rail surface 126 cams a rear corner 128 to pivot the rear cam 59 along with the front cam 35, the cam spindle 46 and the click plate 73. The click plate has a resilient, longitudinal movement, as explained, against spring 82a and turns its corrugated patterns 80 to a second position relative to fingers 79, as shown in FIG. 5. The pawl 104 continues to travel along channel 123 where it is held in its pivoted position through a partial sprocket rotation by the rail 130. When the pawl 104 clears the rail 130 it cannot return to its centered position because now a first tooth 131 of the swinging sector 112 is alongside chain 110, as shown in FIG. 4, and the chain is holding the swinging sector 112 in the shift position.

As the sprocket rotation continues the chain slides down the inner or guide surface of the swinging sector 112 and is thereby simultaneously moved laterally to engage small sprocket 119. Continued rotation after the chain 110 has been put in driving engagement with small sprocket 119 moves the swinging sector 112 into a free zone identified by the double headed arrow FZ, FIG. 2, where it is between the runs of the chain and not in contact with the chain. Spring 115 acts to return the swinging sector 112, along with the shift lever 117 and pawl 104, to the position shown in FIG. 3. If, however, spring 115 should fail, by reason of dirt of corrosion for example, to return the parts to the position of FIG. 3, pawl 104 will strike cam surfaces 132 on pawl guide housing 100 to force the pawl 104 and sector 112 back to the position of FIG. 3.

Sequence II

With the same condition of Sequence I, but with the lever 22 pulled at a time when the pawl 104 is in a position to block the front cam 35. The rear cam 59 is rotated to the down position but the front cam 35, which has rotational movement in relation to the rear cam 59, as explained above, rotates only as far as the pawl 104 will allow and cannot continue travel until the pawl 104 has been moved out of the path. It should be noted that the fingers 79 of the clutch plate 68 have enough friction hold in the corrugated patterns 80 of the click plate 73 to compress spring 50 and to bias the front cam 35. When the pawl moves out of the travel path, the front cam 35 assumes the down position. If pedalling continues in a forward direction Sequence I occurs as soon as the pawl 104 comes around to strike the front cam or Sequence III occurs if the pedalling is backward.

Sequence III

If the pedalling is backward without any forward pedalling during the operation of the mechanism and lever 22 is pulled, the cams 35 and 59 rotate to the down position. Each time the pawl 104 passes the front cam 35 the cam rotates out of the way and, after the cam pawl passes, resumes the down position to wait for Sequence I to be completed.

Sequence IV

In this sequence the steps involved are the same as in Sequence I until the pawl 104 has passed corner 128 of the rear cam 59 and before the swinging sector 112 has rotated into the zone FZ. Now, however, the pedalling is stopped and reversed. The swinging sector 112 and pawl 104 are still in the shift position. The backward rotation brings the pawl 104 back along channel 12 and past the corner 128 of the centrally positioned rear cam 59 (there being clearance between the corner 128 and rub rail surface 126 until the pawl 104 strikes the corner 125, since there is not sufficient clearance between corner 125 and the rub rail surface 126 for the pawl to pass). Braced by the rub rail the pawl 104 cams corner 125 out of the way, thereby turning the cam spindle 46 and cams 35 and 59 and the click pate 73 back to the down position, as shown in FIGS. 4 and 6. As the pawl 104 clears corner 125, spring 115 biases the swinging sector 112 and the shift lever 117 and pawl 104 back to the position of FIG. 3. If spring 115 should fail to operate cam surfaces 133 of the cam, housing 100 will force the pawl 104 to the position of FIG. 3. If back pedalling continues the operational sequence will proceed as described in Sequence III.

Sequence V

In this sequence the reverse chain shifting operation to that described in Sequence I has been completed while pedalling is in the forward direction. In this sequence the pawl 104 does not interfere with the front cam 35 and the lever 22 is released, i.e., placed in the not pulled position. The cams 35 and 59 are then placed in the up position and cam surface 58 of the front cam 35 will move the pawl toward the center of the sprockets where it will follow channel 124 and the chain will be moved from the small sprocket 119 to the large sprocket 111. It will be apparent that similar reverse shifting operations will be followed for Sequences II, III and IV. The shifting operations performed by the swinging sector in this direction has been described in U.S. Pat. No. 4,127,038, wherein the swinging sector 112 places some of its teeth in the plane of the adjacent sprocket and thereby entrains the chain 110 thereon.

Sequence VI

If the control mechanism 13 is arranged as shown in FIG. 3, then it can be said the control mechanism "remembers" the chain should be on the large sprocket 111. If, however, the chain by some accident is placed on the small sprocket 119, pulling of the lever 22 results in a command to "shift down". All of the events described in Sequence I occur except that the chain, being on the small sprocket 119, is not disturbed. At the completion of this false shift the control mechanism 13 "remembers" the chain to be on the small sprocket, and it is now correct.

Sequence VII

If the control mechanism 13 is arranged as in FIG. 5, with the lever pulled, then it can also be said it "remembers" the chain 110 to be on the small sprocket 119. If by accident the chain is on the large sprocket 111 and the lever 22 is released to the not pulled position, then a command is given to "shift up" and Sequence V occurs. As the pawl moves along channel 124 it is held in the shift position by a rail 124 of the pawl guide housing 100. The swinging sector 112 is in a tilted position, as shown in FIG. 5. As the sprockets rotate the chain 110, as shown in phantom in FIG. 5, instead of sliding off the front surface of the sprocket 111 and being lost from the sprocket, hit an inclined surface 135 of a safety tab 136 which is attached to the side of sprockets 111 by means of screws 137. Safety tab 136 holds the chain clear of the teeth of the swinging sector 112. When the pawl 104 clears the rail 134 the swinging sector 112 returns to the position of FIG. 3. The force of the chain 110 on the inclined surface 135 assist the spring 115 in returning the swinging sector 112 to the position of FIG. 3. When pawl 104 has cleared rail 134, the rotation of the sprockets has progressed to the point that teeth of the swinging sector are radially in line with the chain, and when the swinging sector snaps back to the position of FIG. 3 the chain falls into engagement with the teeth of the swinging sector 112. The control mechanism 13 now correctly remembers the chain 57 to be on the big sprocket 111.

Although a preferred form of my invention has been herein disclosed, it is to be understood that the present disclosure is by way of example and that variations are possible without departing from the subject matter coming within the scope of the following claims, which subject matter I regard as my invention.

I claim:

1. In a sprocket shift assembly having
    a large sprocket;
    a smaller sprocket;
    a chain arranged to engage each of said sprockets; and
    shifting means to shift the chain from one of said sprockets to the other, the improvement comprising
    a pivotable segment of at least one of said sprockets;
    a pawl connected to said pivotable segment;

cam means including channel means through which the pawl is travelled; and control means to position the cam means for engagement by the pawl and to thereby position the pivoted segment.

2. In a sprocket shift assembly the improvement as in claim 1, wherein the cam means includes a pivotally mounted front cam; and a rear cam, each of said cams having side walls defining a central channel therebetween and the control channel of the rear cam forming a continuation of the central channel of the front cam.

3. In a sprocket shift assembly, the improvement as in claim 2, further including a cam housing having rub rail surfaces interiorly thereof to cooperate with the side walls of the cams to define channel means through which the pawl is travelled.

4. In a sprocket shift assembly the improvement as in claim 3, wherein the rear cam has a front corner thereon movable between a down position providing clearance for the pawl therepast between the corner and a rub rail of the cam housing and a position wherein the corner is engaged by the pawl moving between said rub rail and said rear cam.

5. In a sprocket shift assembly the improvement as in claim 4, wherein the rear cam further includes a rear corner engageable by the pawl travelling in a channel between the rub rail and the rear cam to move the front and rear cams to a central position.

6. In a sprocket shift assembly, the improvement as in claim 5, wherein the cam housing includes central cam surfaces to orient the pawl as it travels therethrough into a central channel.

7. In a sprocket shift assembly the improvement as in claim 6, wherein the cam housing includes rails arranged to hold the pawl during a position of chain rotation until the chain is positioned to engage a receiving sprocket.

8. In a sprocket shift assembly the improvement as in claim 1, wherein the pivotable segment has a safety tab affixed thereto and projecting therefrom to limit movement of the chain and to guide the chain onto teeth of the pivotable segment.

9. In a sprocket shift assembly the improvement as in claim 2, wherein the pivotable segment has a safety tab affixed thereto and projecting therefrom to limit movement of the chain and to guide the chain onto teeth of the pivotable segment.

10. In a sprocket shift assembly the improvement as in claim 3, wherein the pivotable segment has a safety tab affixed thereto and projecting therefrom to limit movement of the chain and to guide the chain onto teeth of the pivotable segment.

11. In a sprocket shift assembly the improvement as in claim 4, wherein the pivotable segment has a safety tab affixed thereto and projecting therefrom to limit movement of the chain and to guide the chain onto teeth of the pivotable segment.

12. In a sprocket shift assembly the improvement as in claim 5, wherein the pivotable segment has a safety tab affixed thereto and projecting therefrom to limit movement of the chain and to guide the chain onto teeth of the pivotable segment.

13. In a sprocket shift assembly the improvement as in claim 6, wherein the pivotable segment has a safety tab affixed thereto and projecting therefrom to limit movement of the chain and to guide the chain onto teeth of the pivotable segment.

14. In a sprocket shift assembly the improvement as in claim 7, wherein the pivotable segment has a safety tab affixed thereto and projecting therefrom to limit movement of the chain and to guide the chain onto teeth of the pivotable segment.

15. In a sprocket shift assembly the improvement as in claim 14, wherein the safety tab is arranged to lift the chain during pivoted movement of the pivotable segment and to guide the chain onto the pivotable segment upon return of the pivotable segment to its nonpivoted position.

16. In a sprocket shift assembly the improvement of claim 1, wherein the control means includes a clutch plate having a central axis means to turn the the clutch plate around the central axis, including fingers with sloped sides projecting from one face thereof;

a click plate opposite at least one face of the clutch plate and each click plate having indentations to receive said fingers; and spring means biasing the clutch plate to engagement with each click plate, and for maintaining such engagement.

17. In a sprocket shift assembly the improvement of claim 7, wherein the control means includes a clutch plate having a central axis means to turn the clutch plate around the central axis, including fingers with sloped sides projecting from one face thereof;

a click plate opposite at least one face of the clutch plate and each click plate having indentations to receive said fingers; and spring means biasing the clutch plate to engagement with each click plate, and for maintaining such engagement.

18. In a sprocket shift assembly the improvement of claim 8, wherein the control means includes a clutch plate having a central axis means to turn the clutch plate around the central axis, including fingers with sloped sides projecting from one face thereof;

a click plate opposite at least one face of the clutch plate and each click plate having indentations to receive said fingers; and spring means biasing the clutch plate to engagement with click plate, and for maintaining such engagement.

19. In a sprocket shift assembly the improvement of claim 15, wherein the control means includes a clutch plate having a central axis means to turn the clutch plate around the central axis, including fingers with shaped sides projecting from one face thereof;

a click plate opposite at least one face of the clutch plate and each click plate having indentations to receive said fingers; and spring means biasing the clutch plate to engagement with each click plate, and for maintaining such engagement.

20. In a sprocket shift assembly having a large sprocket;

a smaller sprocket;

a chain arranged to engage each of said sprockets; and shifting means to shift the chain from one of said sprockets to the other, the improvement comprising a pivotable segment of at least one of said sprockets;

a pawl connected to said pivotable segment;

cam means including channel means through which the pawl is travelled; and control means including means for providing a memory of chain position, to position the cam means for engagement by the pawl.

21. In a sprocket shift assembly the improvement as in claim 1, wherein hinge means interconnects the pivotable segment and the sprocket connected thereto, the said hinge means extending normal to the resultant of the combined torque and compressive forces developed between the said sprocket and the chain.

22. In a sprocket shift assembly, the improvement as in claim 21, wherein the pivotable segment is fully positionable between runs of the chain whereby the pivotable segment is movable without load thereon.

23. In a sprocket shift assembly, the improvement as in claim 22 wherein the pivotable segment includes a guide surface for directing the chain therealong to another sprocket.

24. In a sprocket shift assembly, the improvement as in claim 22 wherein the pivotable segment forms part of the large sprocket and a side surface thereof provides a guide for a chain moving from said large sprocket to the small sprocket.

25. In a sprocket shift assembly, the improvement as in claim 1, wherein the pawl and the cam means include cooperating surfaces arranged to provide a sliding point contact therebetween, whereby the pawl is readily guided by the cam means.

26. In a sprocket shift assembly, the improvement as in claim 25, wherein the cooperating surfaces on the pawl comprise knife edges angled with respect to the cooperating surfaces of the cam means.

27. In a sprocket shift assembly, the improvement as in claim 26 wherein the cooperating surfaces on the cam means comprise corners engaged by the knife edges of the pawl.

28. In a sprocket shift assembly having a large sprocket;

a smaller sprocket;

a chain arranged to engage each of said sprockets; and shifting means to shift the chain from one of said sprockets to the other, the improvement comprising a pivotable segment of at least one of said sprockets, said segment being pivotable between runs of the chain, whereby the pivotable segment is movable without load thereon.

29. In a sprocket shift assembly having a large sprocket;

a smaller sprocket;

a chain arranged to engage each of said sprockets; and shifting means to shift the chain from one of said sprockets to the other, the improvement comprising a pivotable segment of at least one of said sprockets, said segment including a guide surface for directing the chain therealong onto the other sprocket.

30. In a sprocket shift assembly, the improvement as in claim 29 wherein the pivotable segment forms part of the large sprocket and a side surface thereof provides a guide for a chain moving from said large sprocket to the small sprocket.

31. In a sprocket shift assembly the improvement as in claim 29, including means to move the pivotable segment whereby the guide surface is engaged by the chain to direct the chain onto the other sprocket.

* * * * *